United States Patent [19]

Boriss

[11] 4,021,806
[45] May 3, 1977

[54] METHOD AND APPARATUS FOR GUIDING AIRCRAFT ALONG CURVED PATH APPROACH PROFILES

[75] Inventor: Robert P. Boriss, Holmdel, N.J.

[73] Assignee: The United States of America as represented by the Secretary of the Army, Washington, D.C.

[22] Filed: Dec. 8, 1975

[21] Appl. No.: 638,238

[52] U.S. Cl. .................... 343/108 R; 235/150.22; 244/188; 343/112 TC
[51] Int. Cl.² .......................................... G01S 1/16
[58] Field of Search ..... 343/112 TC, 112 C, 108 R, 343/108 M; 244/188; 235/150.22

[56] References Cited

UNITED STATES PATENTS

| | | | |
|---|---|---|---|
| 3,081,454 | 3/1963 | Gabelman et al. | 343/112 TC |
| 3,097,357 | 7/1963 | Durnal | 343/112 TC |
| 3,776,455 | 12/1973 | Gee | 235/150.22 |

Primary Examiner—Richard A. Farley
Assistant Examiner—Richard E. Berger
Attorney, Agent, or Firm—Nathan Edelberg; Jeremiah G. Murray; Michael J. Zelenka

[57] ABSTRACT

A microwave landing system wherein a plurality of curved path approach profiles are defined tangent to the localizer beam center line. The coordinates of a desired profile are transmitted to the aircraft which then is directed to fly along the curved path and into the localizer center line to touchdown.

10 Claims, 5 Drawing Figures

4,021,806

METHOD AND APPARATUS FOR GUIDING AIRCRAFT ALONG CURVED PATH APPROACH PROFILES

GOVERNMENT LICENSE

The invention described herein may be manufactured and used by or for the Government for governmental purposes without the payment of any royalties thereon or therefor.

BACKGROUND OF THE INVENTION

1. Field of the Invention

Broadly speaking, this invention relates to aviation. More particularly, in a preferred embodiment, this invention relates to methods and apparatus for guiding and controlling aircraft in a landing zone.

2. Discussion of the Prior Art

The difficulties of safely landing aircraft have been widely reported. When the environment is hostile, for example, in a tactical military situation, or where traffic congestion exists or the weather is marginal, the pressure on the pilot and on the traffic controller often leads to dangerous situations, if not to fatal accidents.

As a solution to these problems, a new generation of landing systems has been developed. Known generically as Microwave Landing Systems (MLS), these systems typically comprise a localizer transmitter which generates a localizer beam indicating to the pilot where he is with respect to the desired lateral flight path, a DME transmitter which permits an onboard computer to determine how far the aircraft is from the DME transmitter and a glideslope transmitter which indicates to the pilot where he is, in terms of a vertical angle, with respect to the landing zone. Some MLS systems are portable and can be fully deployed by only two men in less than an hour. Thus, in a tactical military situation, for example, a clearing can be made in the jungle and the MLS equipment deployed before the enemy can take effective countermeasures, with obvious advantages.

As effective as such MLS systems are, they by themselves do not fully solve the problems of efficient aircraft guidance and control in the terminal area, particularly the funneling of a plurality of incoming aircraft into the landing pattern. The problem, then, is to devise a scheme for such control and guidance which is compatible with MLS landing systems and, indeed, which permits maximum utilization of MLS capabilities.

SUMMARY OF THE INVENTION

The above problems have been solved by the instant invention which, in a preferred embodiment, comprises a method of guiding an aircraft towards a landing site. The method comprises the steps of transmitting into a region of space a plurality of radio beams which permits said aircraft to determine its azimuth, elevation and range to the landing site, defining in the region of space at least one curved path approach profile, the profile being tangent to the desired approach path for the landing site, transmitting to the aircraft the coordinates of the profile, and then generating in said aircraft signals for the aircraft such that the aircraft is directed along the profile and into the desired approach path.

The invention and its mode of operation will be more fully understood from the following detailed description, when taken with the appended drawings, in which:

DETAILED DESCRIPTION OF THE INVENTION

Figure 1:
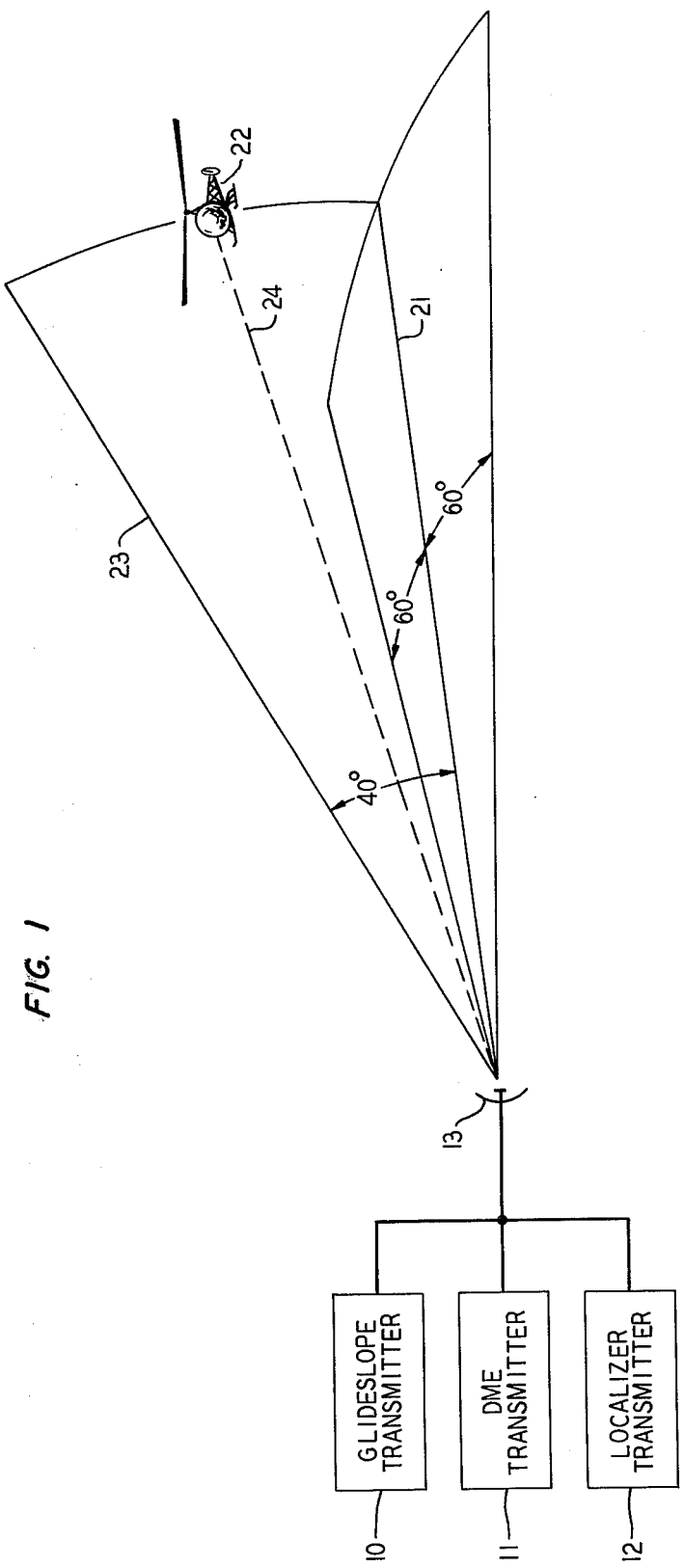
FIG. 1 is a schematic drawing of a typical Microwave Landing System.

FIG. 1 depicts a typical MLS system. As shown, the system includes a glideslope transmitter 10, a DM transmitter 11 and a localizer transmitter 12. These transmitters operate, typically, in either the 15 or 5 GHZ band and have a range of about 20–40 miles in good weather. The three transmitters are connected to their individual antennas, however, to avoid cluttering the drawing, only one antenna, element 13, is shown in the drawing.

The antenna for localizer transmitter 12 sweeps through a 360° angle but the transmitter is keyed only for that portion of the sweep that corresponds to an angle of 60° to the left and 60° to the right of the desired approach to the landing site; thus, the localizer proportional coverage sector is 120° wide.

In the drawing, the localizer center line is designated by the numeral 21. Within the 120° coverage of the localizer beam, the antenna of the glideslope transmitter sweeps through a vertical angle of 45° (−5° to +40° with respect to the horizon). The antenna which is connected to the Distance Measuring Equipment (DME) transmiter radiates a signal which enables a computer on the aircraft 22 to compute how far it is to the landing site. In most MLS systems, a pulse transmitted by the aircraft is received by the MLS system, delayed by a fixed amount and then re-transmitted by the DME transmitter to the aircraft. In the aircraft, a simple calculation yields the distance to the DME transmitter. The DME signal may also be used on the aircraft to compute range rate. In FIG. 1, the numeral 23 represents the DME beam and the numeral 24 represents the glideslope beam.

In a typical system, a shaft encoder on the antenna of the localizer transmitter continuously yeilds a digital signal which is indicative of the instantaneous azimuth of the localizer beam. This digital signal is then modulated onto the localizer beam; thus, as aircraft 22 flies into the localizer beam an onboard receiver can immediately determine how far to the left or right of the localizer center line the aircraft's instantaneous position is. A similar encoder on the glideslope antenna produces a signal which is indicative of the instantaneous elevation of the glideslope beam; thus, as the aircraft flies into this beam, an onboard glideslope receiver can immediately determine the elevation of the aircraft at the instant it crosses the beam. Because both the distance to the DME transmitter and the elevation are known, simple triangulation will yield the plane's altitude.

The three transmitter antennas are, of course, positioned at the end of the runway if the system is used with fixed wing aircraft, or near the landing zone if the system is used with rotary wing aircraft.

Now, merely knowing where one is with respect to the landing zone is not sufficient to guarantee safe guidance because theoretically there are a very large number of possible paths between the aircraft and the final approach path. Thus, there is nothing to prevent two pilots, or a harried air controller, from selecting intersecting paths to the final approach path, with potentially disastrous results.

However, according to the invention, the existing MLS system may be extended to precisely define a plurality of paths in space, which paths provide incoming aircraft with curved-path approach profiles leading to aquisition of the landing system localizer beam.

Figure 2:
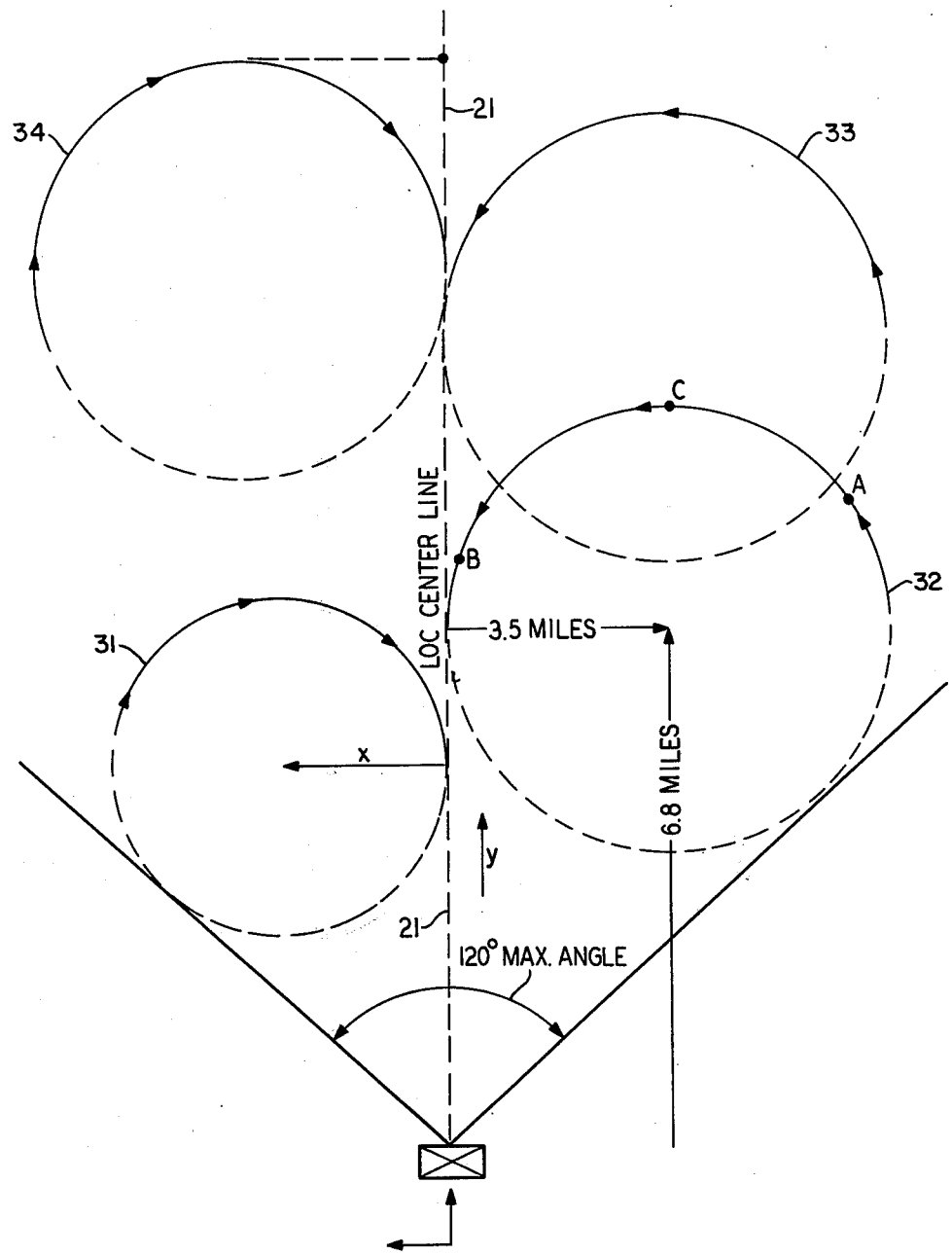
FIG. 2 is a schematic drawing which illustrates the manner in which a plurality of curved-path approach profiles are generated.

Referring now to FIG. 2, which depicts four such curved-path approach profiles, 31, 32, 33 and 34, it will be seen that each profile can be defined by simply specifying the location of the center of the circle, in either cartesian or polar coordinates, and the side of the localizer center line on which the center lies, i.e., left or right.

Advantageously, all these circles are tangent to the localizer centerline. Thus, by using the MLS guidance signals, the location of the circle's center, and a simple onboard computation, signals can be generated which will guide the aircraft along the selected profile and onto the final approach path.

Figure 3:
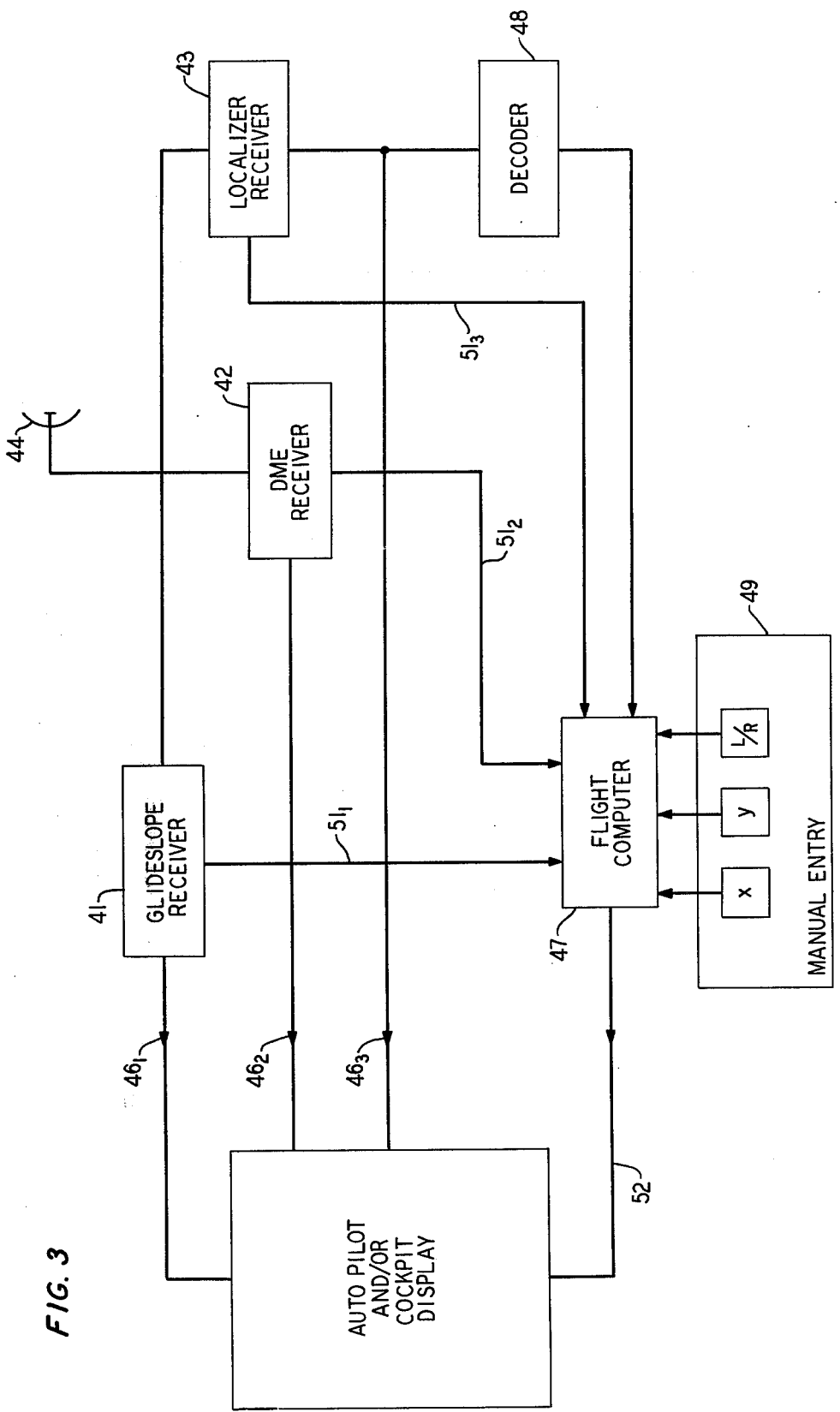
FIG. 3 is a block schematic diagram of an illustrative aircraft arrangement for use with the system of FIG. 1.

FIG. 3 depicts the circuitry required on the aircraft to implement this procedure. As shown, a glideslope receiver 41, a DME receiver 42 and a localizer receiver 43 are connected to an antenna 44 and these receivers respectively receive and decode the glideslope, distance and localizer signals which are transmitted from the ground. These decoded signals are fed, via leads $46_1$–$46_3$, to the cockpit display and/or autopilot in the normal manner. According to the invention, the aircraft is also supplied with a flight computer 47 which computes the flight adjustments necessary to keep the aircraft on the desired curved-path approach profile.

Figure 4:
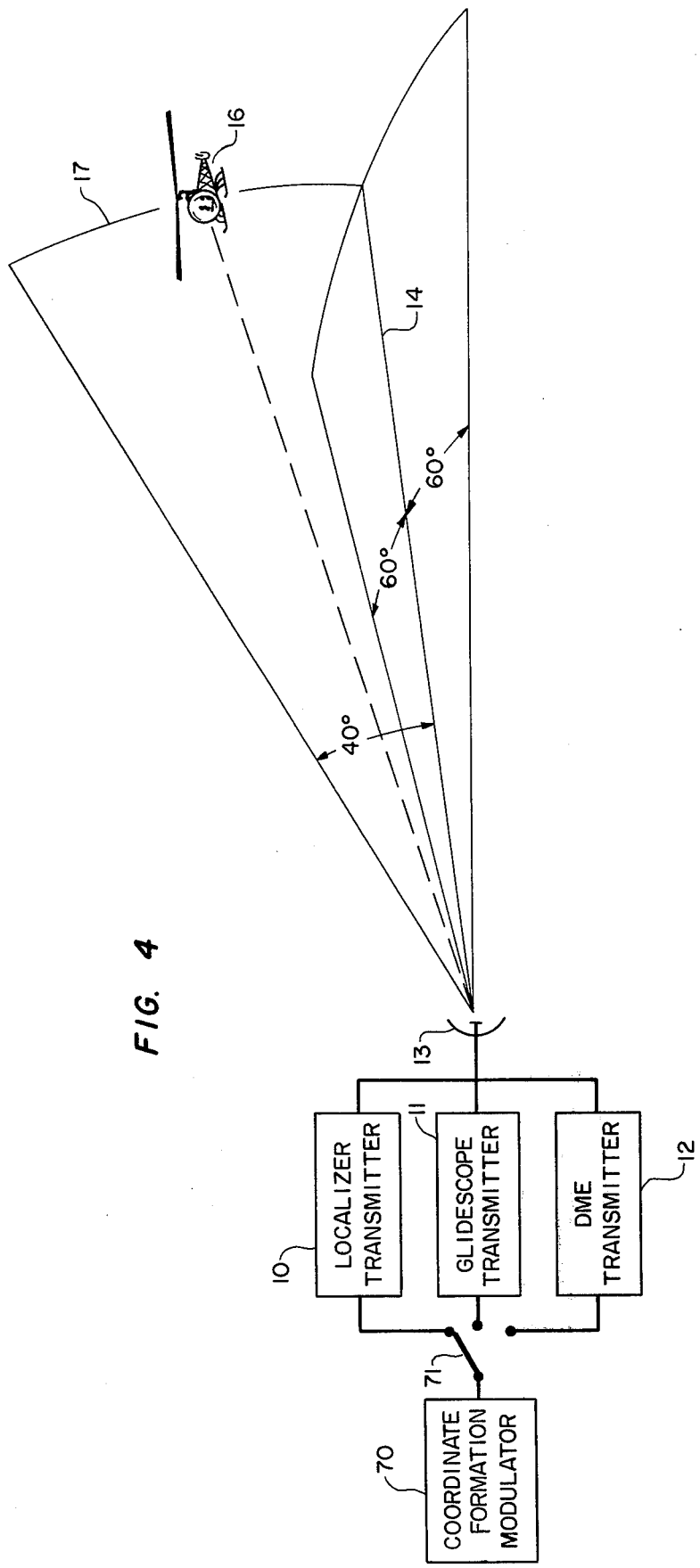
FIG. 4 is a schematic drawing of an illustrative microwave landing system in accordance with the invention employing coordinate information modulation of a three beam system.
Figure 5:
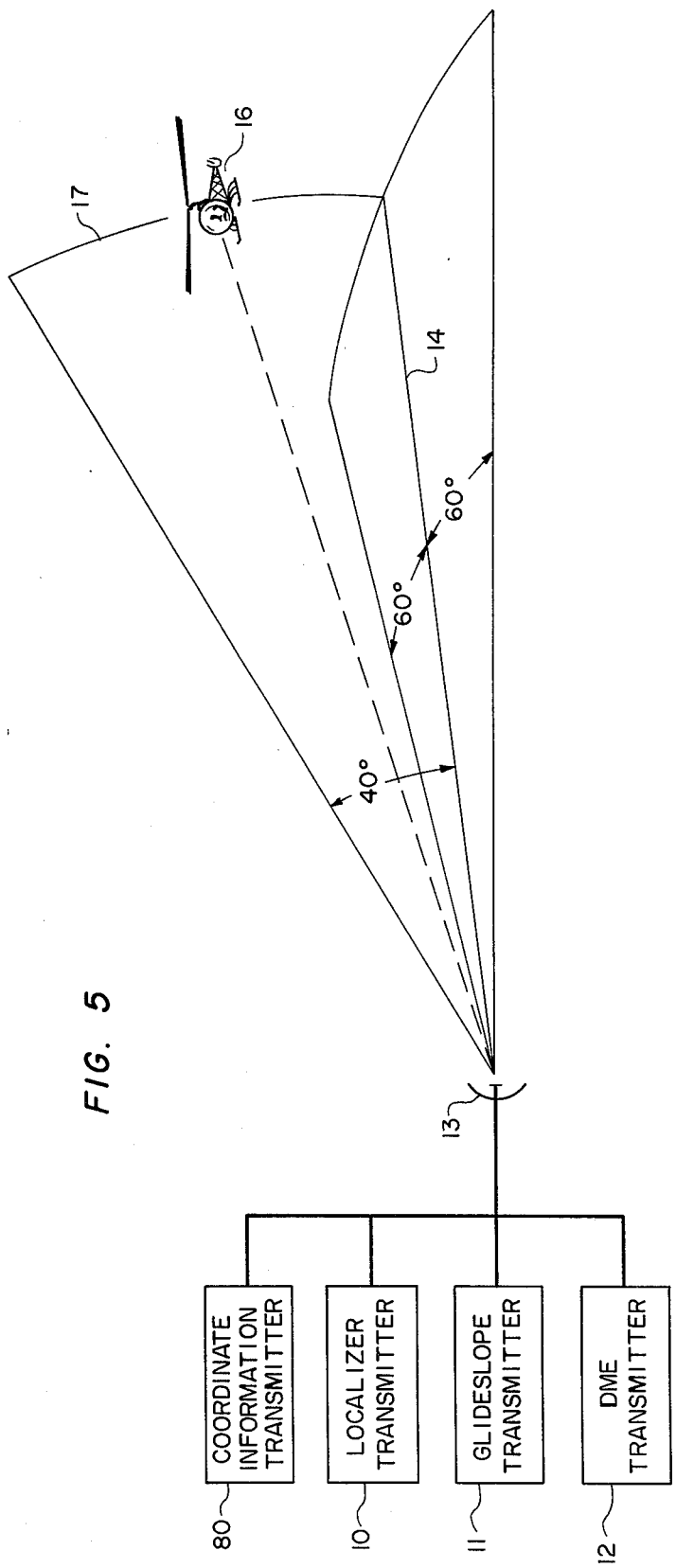
FIG. 5 is a schematic drawing of an alternative microwave landing system utilizing a fourth beam carrying coordinate information.

The location of the particular curved-path profile that the controller wishes the aircraft to assume is modulated at the ground station upon one of the beams, for example, the localizer beam. FIG. 4 illustrates a system in block diagram form wherein a coordinate information modulator 70 may be selectively coupled to the Localizer, Glideslope, or DMF transmitter through switch 71 in order to provide the aircraft with coordinate information relative to the desired curve path profile. This signal is decoded by a decoder 48 connected to receiver 43 and fed to computer 47. Alternatively, the controller can radio this information to the pilot who can manually enter the coordinates of the circle with manual entry circuit 49 which, in the simplest embodiment, may comprise nothing more than three thumbwheel switches, or the like. A system utilizing a separate coordinate information transmitter is shown in FIG. 5. Computer 47 also receives the output of glideslope receiver 41, DME receiver 42 and localizer receiver 43, via lines $51_1$–$51_3$, respectively. The output of computer 47 is connected to the autopilot and/or cockpit display of the aircraft, via line 52.

Returning to FIG. 2, in operation, assume that an aircraft pilot arrives at point A on path 42, which must, of course, lie within the MLS coverage volume. The air traffic controller determines that approach profile 42 is free and then directs the pilot to select the following numbers on his control unit $X = 3.5$ miles
$Y = 6.8$ miles
$R/L = $ Left Or, the controller could key this information into the localizer transmitter for decoding by decoder 48.

After the appropriate calculations by flight computer 47, the pilot (or the autopilot) then receives guidance signals which direct the aircraft along circle 42 to point B. Glideslope acquisition may be initiated anywhere within the flight profile starting at point C. This, in effect, provides a spiral letdown approach. Of course, if conditions are inappropriate for letdown, the plane may be held in circle 42 until cleared for landing.

There are no limits, other than practical ones, which restrict the number and location of the profile circle centers. So long as the aircraft receives signals from the landing system, guidance signals can be generated by computer 49 and either coupled into the autopilot or used to drive a pilot display (flight director or raw data).

The above-described technique for performing curved-path approaches is applicable to both military and civil operations. It provides the following features:

1. Terminal area air traffic control is facilitated — the pilot after receiving his assigned profile need only follow his aircraft instruments or switch on the autopilot, thereby significantly reducing the communications required between the ground controller and the pilot; thus, positive control of the aircraft's flight path is ensured.

2. High density aircraft operations can be accommodated. That is, a large number of aircraft can be properly spaced and funnelled into the landing system, thereby providing improved operations in terms of safety and efficiency.

3. The overflight of critical ground areas can be avoided. Flight profiles can immediately be altered to meet changing conditions, i.e., hostile ground fire. Further, flight profiles can be randomly selected to avoid concentration of hostile fire. Also, congested or sensitive areas in the civil environment can be avoided for safety of flight and noise abatement.

4. A myriad of profiles can be established with the minimum sophistication of airborne hardware, i.e., computers/displays.

One skilled in the art can make various changes and substitutions to the arrangement of parts shown with departing from the spirit and scope of the invention.

What I claim is:

1. A method of guiding an aircraft towards a landing site, comprising the steps of:
    transmitting into a region of space a plurality of encoded radio beams which permit said aircraft to determine its azimuth, elevation and range to said landing site;
    defining in said region of space at least one curved-path approach profile, said profile being tangent to the desired approach path for said landing site;
    transmitting to said aircraft the coordinates of said profile; and then
    generating in said aircraft signals for said aircraft such that said aircraft is directed along said profile and onto said desired approach path.

2. The method according to claim 1 wherein said curved-path approach profile comprises a circle, said coordinates comprise the center of said circle expressed in Cartesian coordinates with respect to said landing site, and said transmitting step comprises:
  modulating digital signals representative of said coordinates on at least one of said radio beams.

3. The method according to claim 1 wherein said curved-path approach profile comprises a circle, said coordinates comprise the center of said circle expressed in polar coordinates with respect to said landing site and said transmitting step comprises:
  modulating digital signals representative of said coordinates on at least one of said radio beams.

4. The method according to claim 1 wherein said curved-path approach profile comprises a circle, said coordinates comprise the center of said circle expressed in Cartesian coordinates with respect to said landing site and said transmitting step comprises:
  modulating an analog signal indicative of said coordinates upon a radio-frequency carrier which is distinct from the radio beams used to generate said azimuth, elevation and range information.

5. The method according to claim 1 wherein said curved-path approach comprises a circle, said coordinates comprise the center of said circle expressed in polar coordinates with respect to said landing site and said transmitting step comprises:
  modulating an analog signal indicative of said coordinates upon a radio-frequency carrier which is distinct from the radio beams used to generate said azimuth, elevation and range information.

6. In a system for guiding an aircraft towards a landing site of the type that comprises:
  means for generating a first radio beam having impressed thereon information pertaining to the instantaneous azimuth of said beam and sweeping said beam through a first area of space;
  means for generating a second radio beam having impressed thereon information pertaining to the instantaneous elevation of said beam and sweeping said beam through a second area of space having some portion thereof in common with said first area of space, said portion being designated the common space; and
  means for receiving a pulsed radio beam from said aircraft, delaying said pulses, and retransmitting said beam back to the aircraft to derive a range signal, said retransmitted beam being designated herein as a third beam, the improvement which comprises:
  means for defining in the common space, at least one curved-path approach profile tangent to the desired approach path to said landing site;
  means for transmitting to said aircraft the coordinate of said profile; and
  means responsive to said received coordinate and to said first, second and third radio beam for generating flight command signals to cause said aircraft to enter said curved-path approach profile.

7. The system according to claim 6 wherein said generating means comprises:
  a receiver tuned to said first radio beam and deriving a signal corresponding to the azimuth of said aircraft;
  a receiver tuned to said second beam and deriving a signal corresponding to the elevation of said aircraft;
  a receiver tuned to said third beam and deriving a signal corresponding to the range of said aircraft;
  means for receiving the profile coordinate signal generated by said transmitting means; and
  a computer, connected to the signals derived from said first, second and third beam receivers and to the output of said profile signal coordinate receiving means, for generating said flight-command signals.

8. The system according to claim 6 wherein said curved-path approach profile comprises a circle, said coordinates are the coordinates of the center of said circle and said transmitting means comprises:
  means for encoding signals representative of said circle center coordinates upon said first radio beam.

9. The system according to claim 6 wherein said curved-path approach profile comprises a circle, said coordinates are the coordinates of the center of said circle, and said transmitting means comprises:
  means for modulatng an analog signal representative of said circle center coordinates upon a fourth radio beam.

10. A method of guiding an aircraft towards a landing site, comprising the steps of:
  transmitting into a region of space a plurality of encoded radio beams which permit said aircraft to determine its azimuth, elevation and range to said landing site;
  defining in said region of sapce at least one curved-path approach profile, said profile being tangent to the desired approach path for said landing site;
  selecting in said aircraft the coordinates of said profile; and then
  generating in said aircraft signals for said aircraft such that said aircraft is directed along said profile and onto said desired approach path.

* * * * *